(12) United States Patent
Jha et al.

(10) Patent No.: US 9,327,843 B2
(45) Date of Patent: May 3, 2016

(54) STROBE LIGHT UNIT AND AIRCRAFT COMPRISING THE SAME

(71) Applicant: Goodrich Lighting Systems GmbH, Lippstadt (DE)

(72) Inventors: Anil Kumar Jha, Lippstadt (DE); Christian Schoen, Mainz (DE); Andre Hessling, Koblenz (DE)

(73) Assignee: GOODRICH LIGHTING SYSTEMS GMBH (DE)

(*) Notice: Subject to any disclaimer, the term of this patent is extended or adjusted under 35 U.S.C. 154(b) by 0 days.

(21) Appl. No.: 14/249,934

(22) Filed: Apr. 10, 2014

(65) Prior Publication Data
US 2014/0328074 A1 Nov. 6, 2014

(30) Foreign Application Priority Data
May 6, 2013 (EP) .................................... 13166654

(51) Int. Cl.
*B64D 47/06* (2006.01)
(52) U.S. Cl.
CPC ............ *B64D 47/06* (2013.01); *B64D 2203/00* (2013.01)
(58) Field of Classification Search
CPC .......... F21Y 2101/02; F21Y 2103/003; H01L 2924/3025; F21S 48/1154; F21S 48/1159; F21S 48/1258; F21S 48/1388; F21V 13/04; F21V 13/06; F21V 13/08; F21V 13/10; F21V 19/001; F21V 1/00; F21V 7/0025; F21W 2101/10; G02B 6/4204; G02B 6/4214; B64D 47/02; B64D 47/04; B64D 47/06; B64D 2203/00; F21K 9/00; F21K 9/50
USPC ............... 362/240–248, 249.01, 249.02, 298, 362/303, 326, 328, 340, 341, 346, 347, 350, 362/351, 470, 479, 507, 512, 538, 539, 362/543–546, 800
See application file for complete search history.

(56) References Cited

U.S. PATENT DOCUMENTS

| | | | | |
|---|---|---|---|---|
| 1,702,746 A * | 2/1929 | Prichard | ............. | F21S 48/1382 362/310 |
| 4,293,901 A * | 10/1981 | Hernandez | .............. | F21S 8/086 362/297 |
| 4,531,180 A * | 7/1985 | Hernandez | .............. | F21V 11/00 362/297 |
| 5,586,015 A * | 12/1996 | Baldwin | ................... | F21V 7/06 362/263 |
| 5,924,789 A | 7/1999 | Thornton | | |
| 6,439,745 B2 * | 8/2002 | Futami | .......................... | 362/297 |
| 7,178,962 B2 * | 2/2007 | Yu et al. | ........................ | 362/609 |
| 7,455,431 B2 * | 11/2008 | Brower | ................. | F21V 7/0025 362/297 |

(Continued)

FOREIGN PATENT DOCUMENTS

EP 2572990 A1 3/2013

OTHER PUBLICATIONS

European Search Report for Application No. 13166654.7-1754, Mailed on Oct. 2, 2013. 6 pages.

*Primary Examiner* — Hargobind S Sawhney
(74) *Attorney, Agent, or Firm* — Cantor Colburn LLP

(57) ABSTRACT

A strobe light unit, particularly wing anti-collision strobe light unit for an aircraft, comprises at least one light source, particularly at least one LED; a reflector element, the at least one light source and the reflector element being configured for projecting light into a desired range of directions; and a stray light blocking element for blocking stray light from being projected into undesired directions, the stray light blocking element attached to the reflector element or to a base portion of the strobe light unit.

20 Claims, 4 Drawing Sheets

(56) References Cited

U.S. PATENT DOCUMENTS

| | | | |
|---|---|---|---|
| 7,722,213 B2 * | 5/2010 | Inoue | F21S 8/026 362/241 |
| 7,824,076 B2 * | 11/2010 | Koester | 362/294 |
| 8,235,539 B2 * | 8/2012 | Thomas | F21S 4/008 362/92 |
| 8,287,165 B2 * | 10/2012 | Iwasaki | 362/517 |
| 8,322,893 B2 * | 12/2012 | Nezu | F21V 7/005 362/241 |
| 8,491,171 B2 * | 7/2013 | Okubo | 362/517 |
| 8,523,417 B2 * | 9/2013 | Kobayashi | 362/539 |
| 8,740,424 B2 * | 6/2014 | Hessling et al. | 362/470 |
| 8,851,723 B2 * | 10/2014 | Peck et al. | 362/516 |
| 2003/0053314 A1 | 3/2003 | Summerford et al. | |
| 2005/0180158 A1 * | 8/2005 | Komatsu | 362/545 |
| 2009/0002997 A1 | 1/2009 | Koester | |
| 2011/0122635 A1 | 5/2011 | Calvin et al. | |
| 2012/0281424 A1 * | 11/2012 | Hansen | B60Q 1/16 362/517 |

\* cited by examiner

STROBE LIGHT UNIT AND AIRCRAFT COMPRISING THE SAME

CROSS REFERENCE TO RELATED APPLICATIONS

This application claims priority to European Patent Application No. 13 166 654.7 filed May 6, 2013, the entire contents of which is incorporated herein by reference.

TECHNICAL FIELD

The invention relates to a strobe light unit, particularly to a wing anti-collision strobe light unit for an aircraft, as well as to an aircraft comprising such strobe light unit.

BACKGROUND

Aircrafts regularly comprise anti-collision strobe light units projecting light with high intensity of illumination. Such anti-collision strobe light units are designed to project light with a desired light distribution around the aircraft's vertical axis and over a certain angular range above and below, for example from +30° to −30°, to the horizontal plane of the aircraft. One or more strobe light units can be used for one aircraft.

One example of such anti-collision strobe lights are wing anti-collision strobe light units that can be located on each wing tip and that flash light, particularly of white colour and high intensity. Larger airliners may be equipped with an additional strobe light unit at the trailing edge as well. Smaller planes can only be equipped with one of such strobe lights near the leading edge close to the red or green navigation light.

Such flashing strobe light units are very bright and intended to attract attention during flight. They are sometimes also used on the runway and during taxi to make the aircraft more conspicuous.

It has been discovered that sometimes light projected by such anti-collision strobe light units reaches the cockpit and causes glare in the cockpit which badly affects the efficiency of the pilot and which compromises safety.

Accordingly, it would be beneficial to provide a strobe light unit that reliably prevents light from reaching the cockpit and from causing glare in the cockpit. Furthermore, it would be beneficial to provide a corresponding aircraft.

SUMMARY

Exemplary embodiments of the invention include a strobe light unit, particularly wing anti-collision strobe light unit for an aircraft, comprising at least one light source, particularly at least one LED; a reflector element, the at least one light source and the reflector element being configured for projecting light into a desired range of directions; and a stray light blocking element for blocking stray light from being projected into undesired directions, the stray light blocking element attached to the reflector element or to a base portion of the strobe light unit.

Exemplary embodiments of the invention further include an aircraft comprising a cockpit and at least one strobe light as described herein arranged as a wing anti-collision strobe light unit, wherein the stray light blocking element is arranged at the side of the strobe light unit oriented towards the cockpit, such that those stray light beams that are projected by the at least one light source and reflected by the cover lens into a direction towards the cockpit are blocked from reaching the cockpit.

BRIEF DESCRIPTION OF THE DRAWINGS

Embodiments of the invention are described in greater detail below with reference to the figures, wherein.

DETAILED DESCRIPTION

Figure 1:
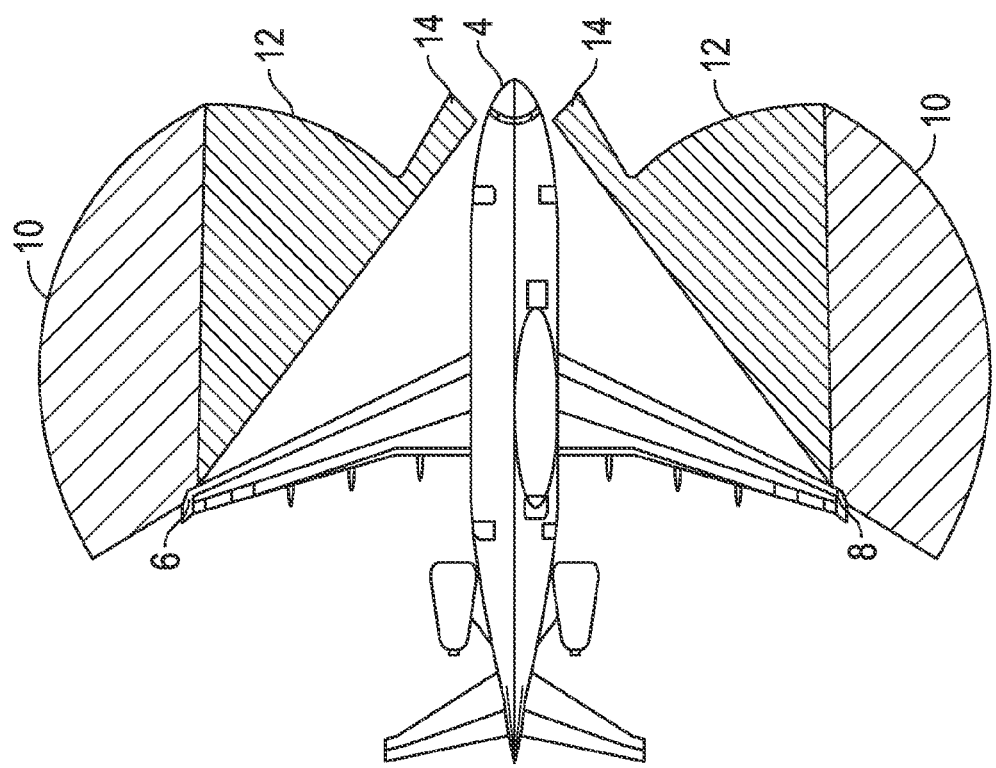
FIG. 1 shows a schematic top view of an aircraft and a typical distribution of light projected by its wing anti-collision strobe light units, according to an exemplary embodiment of the invention.

FIG. 1 shows a schematic top view of an aircraft 2 and a typical distribution of light projected by its left wing anti-collision strobe light unit 6 and its right wing anti-collision strobe light unit 8.

The left and right wing anti-collision strobe light units 6 and 8 are located at the respective wing tips of the aircraft 2, as can be seen in FIG. 1. The cockpit in which the pilot is located is designated with reference numeral 4. The left and right wing anti-collision strobe light units 6 and 8 are designed to project light with a desired light distribution over a certain angular range around the aircraft's vertical axis and over a certain angular range above and below the horizontal plane of the aircraft, for example from +30° to −30°, with respect to such horizontal plane.

The left and right wing anti-collision strobe light units 6 and 8 project flash light particular of white colour and high intensity. Typical intensity values are 400 cd to 2000 cd.

The left and right wing anti-collision strobe light units 6 and 8 in the present non-limiting embodiment are configured to project light with a desired light distribution 10 ranging from 0° corresponding to the flight direction of the aircraft 2 to approximately 130° in flight outward direction and to project light into so-called overlap areas 12 in respective flight inward directions extending from 0° to about 30° to the respective other side of the aircraft 2. That part of the projected light of the overlap area 12 that is projected into the direction of the cockpit 4 and that can cause glare to the pilot is designated with the reference numeral 14 and visualized specifically by a longer representation of the light reaching the cockpit 4.

In the overlap area 12, the light projected by the left and right wing anti-collision strobe light units 6 and 8 overlaps with light projected from other anti-collision strobe light units (not shown).

The explanation of the other main parts of the aircraft 2 and in particular of the other light units is omitted for brevity.

Figure 2A:
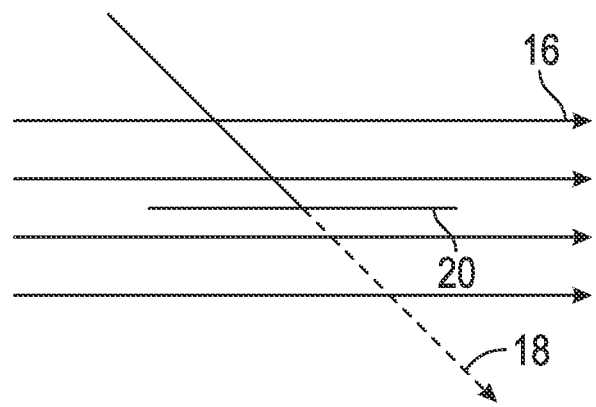
FIG. 2(a) shows a schematic principle of a stray light blocking element letting parallel light beams pass and blocking only undesired stray light beams.

FIG. 2(a) shows a schematic principle of a stray light blocking element 20 letting parallel light beams 16 pass and blocking only undesired stray light beams 18.

Figure 2B:
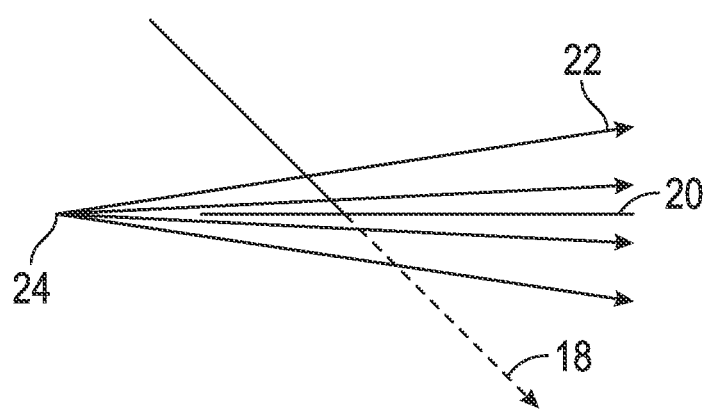
FIG. 2(b) shows a schematic principle of a stray light blocking element letting radial light beams pass and blocking only undesired stray light beams.

FIG. 2(b) shows a schematic principle of a stray light blocking element 20 letting radial light beams 22 pass and blocking only undesired stray light beams 18.

The light source from which the parallel light beams 16 are emitted/projected is not shown for brevity.

The stray light blocking element 20 is of planar shape and extends into the same direction as the parallel light beams 16. Therefore, the parallel light beams 16, except for that light beam(s) that impinge(s) on that end of the stray light blocking element 20 that faces the light source, are unaffected by the stray light blocking element 20 and can pass as if no stray light blocking element 20 were present.

Any other light beams, particularly stray light beams 18 that run in an angle with respect to the parallel light beams 16 and to the planar stray light blocking element 20 and that impinge on the stray light blocking element 20 are blocked.

The stray light blocking element 20 is made of a non-transparent, particularly light tight material, especially a flexible plastics material.

In the representation of FIGS. 2(a) and 2(b) the arrows of the stray light beams 18 after the stray light blocking element 20 are depicted with a broken line. This representation is intended to show the course of the stray light beam 18 in case no stray light blocking element 20 were present and the stray light beam 18 could pass.

According to FIG. 2(b) a light source 24 emits radial light beams 22, and the substantially planar stray light blocking element 20 extends into a radial direction from the light source 24 such that all the radial light beams emitted by the light source 24, except for that radial light beam(s) that impinge(s) on the end of the stray light blocking element 20 facing the light source 24, are unaffected by the stray light blocking element 20 and can pass.

Figure 3:
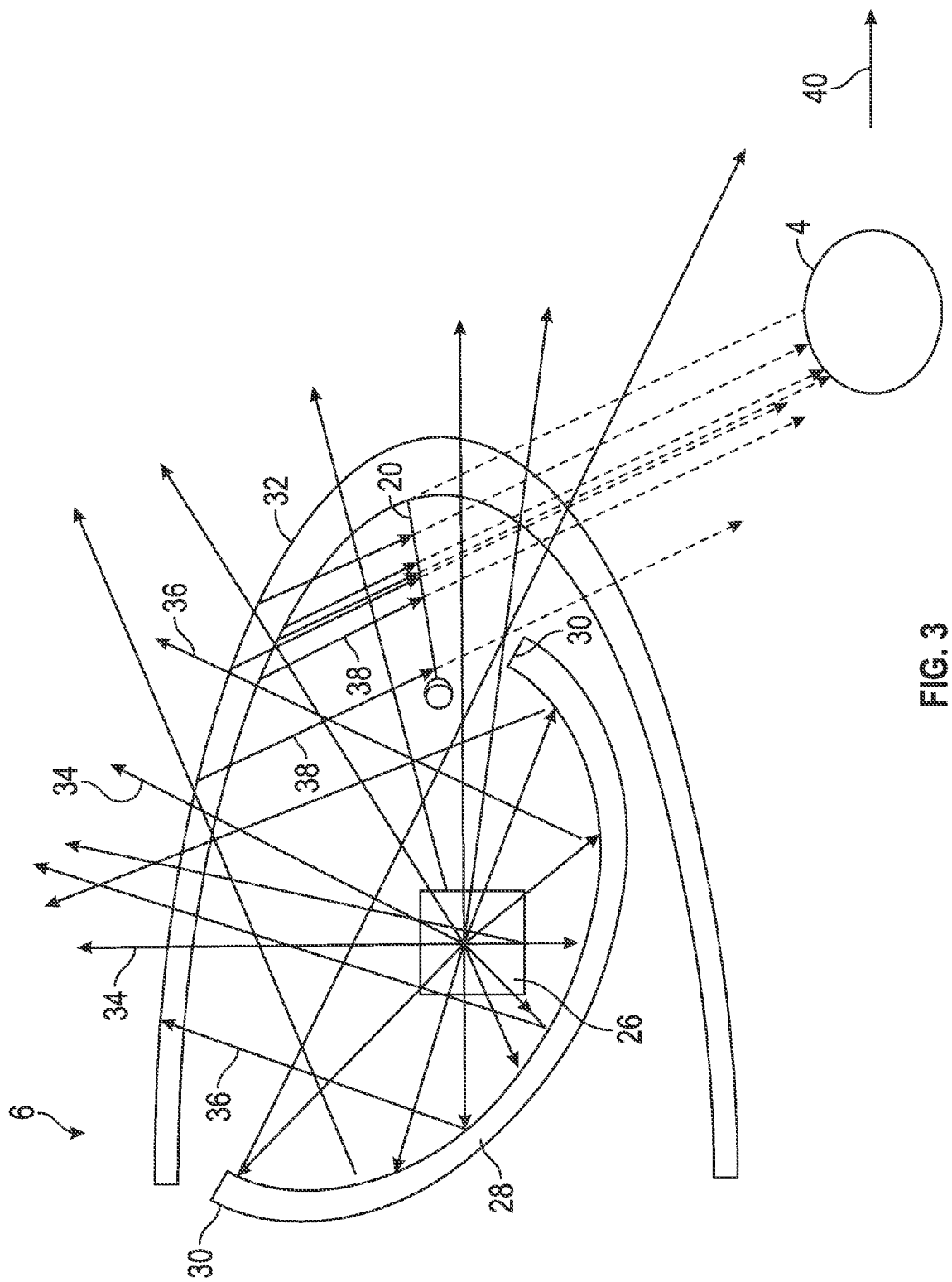
FIG. 3 shows a schematic sectional view, taken along a horizontal cutting plane, of the left wing anti-collision strobe light unit of FIG. 1 and the distribution of light projected by said strobe light unit and of the cockpit of the aircraft of FIG. 1, according to an exemplary embodiment of the invention.

FIG. 3 shows a schematic sectional view, taken along a horizontal cutting plane, of the left wing anti-collision strobe light unit 6 and the distribution of light projected by said strobe light unit 6 and of the cockpit 4 of the aircraft 2.

In a narrow sense, the strobe light unit 6 comprises at least one light source that is formed in the present non limiting embodiment as one LED 26, a reflector element 28 and a stray light blocking element 20.

In the schematic, non limiting embodiment, the LED 26 is configured to emit light 360° around its vertical axis. The reflector element 28 is arcuate-shaped and comprises a reflecting inner surface which is oriented obliquely in flight outward direction. The LED 26 is arranged within a space spanned by the inner reflecting surface of the reflector element 28 and a straight line connecting the end portions 30 of the reflecting inner surface.

The stray light blocking element 20 has a substantially planar main portion and a rear mounting portion. The planar main portion of the stray light blocking element 20 is arranged in radial direction with respect to the center of the LED 26. The stray light blocking element 20 is located at a position in front of the forward end of the space spanned up by the reflector element 28 and the forward reflector element end portion 30. In the present non-limiting embodiment, the planar main portion of the stray light blocking element 20 is arranged at an angle of about +10° with respect to the flight direction which flight direction is designated with reference numeral 40. The planar main portion of the stray light blocking element 20 can be arranged at an angle of about 50° with respect to the axis of symmetry of the reflector element 28.

In a broad sense, the strobe light unit 6 further comprises an arcuate cover lens 32 that encloses the other parts of the strobe light unit 6, namely the LED(s) 26, the reflector element 28 and the stray light blocking element 20. The cover lens 32 closes the strobe light unit 6 in front, flight outwards and flight inwards directions. The arcuate cover lens 32 is transparent at least in those regions that correspond to the required light distribution area 10 and the overlap area 12, see FIG. 1.

The distribution of the light beams projected by the strobe light unit 6 is as follows. Direct light beams 34 emitted by the LED 26 impinging on the arcuate cover lens 34 and passing therethrough are designated with reference numeral 34 and form direct light beams. They are oriented radially to each other.

Light beams emitted by the LED 26 impinging on the reflecting inner surface of the reflector element 28, reflected by the same, impinging on the arcuate cover lens 32 and passing therethrough are designated with reference numeral 36 and form reflected light beams 36. Direct light beams 34 and reflected light beams 36 can be parallel to each other.

Light beams, particularly reflected light beams 36, when impinging on the inner surface of the arcuate cover lens 32 and when impinging on the outer surface of the arcuate cover lens 32 can be reflected partially or in total and those reflected light beams that are reflected into the direction of the cockpit 4 are designated with reference numeral 38 and called stray light beams 38. For better visualization, only those stray light beams 38 that project into the direction of the cockpit 4 are shown.

The planar main portion of the stray light blocking element 20 has a rear end and a front end, seen in optical direction. The rear end is arranged in vicinity to the front end portion 30 of the reflector element 28 and mounted to the reflector element 28 or to a base portion (not shown) of the strobe light unit 6 in a flexible manner. The front end extends to the inner surface of the arcuate cover lens 32 and abuts thereto.

By such configuration of the strobe light unit 6, and particularly of the stray light blocking element 20, the path through which stray light beams 38 reflected at the arcuate cover lens 32 could reach the cockpit 4 is reliably closed.

The stray light beams 38 are shown as straight lines extending from the arcuate cover lens 32 to the stray light blocking element 20. In order to visualize that these stray light beam would in fact reach the cockpit 4 in case no stray light blocking element 20 would be present, these stray light beams 38 are continued as broken lines to the cockpit 4. The stray light blocking element 20 reliably prevents, however, that such stray light beams 38 pass through and reach the cockpit 4.

By making the stray light blocking element 20 out of flexible material, particularly flexible plastics material and/or by mounting it to the reflector element 28 or to a base of the strobe light unit 6, the stray light blocking element 20 is movable and/or pivotable. Therefore the stray light blocking element 20 is self-adjusting/self-adapting to the cover lens 32 and forms a gap-less closure between the LED 26 and the reflector element 38, a combination of which can be called light head, on the one hand and the cover lens 32 on the other, in order to block stray light beams 38 from passing into the undesired directions to the cockpit 4.

In general, the description of the left wing anti-collision strobe light unit 6 is only of exemplary nature, and the same description likewise applies to the right wing anti-collision strobe light unit 8 which is omitted for brevity. The drawing of FIG. 3 is not to scale and only intended to disclose the structure and the functioning of the strobe light unit 6 according to this non exemplary embodiment of the invention.

Figure 4:
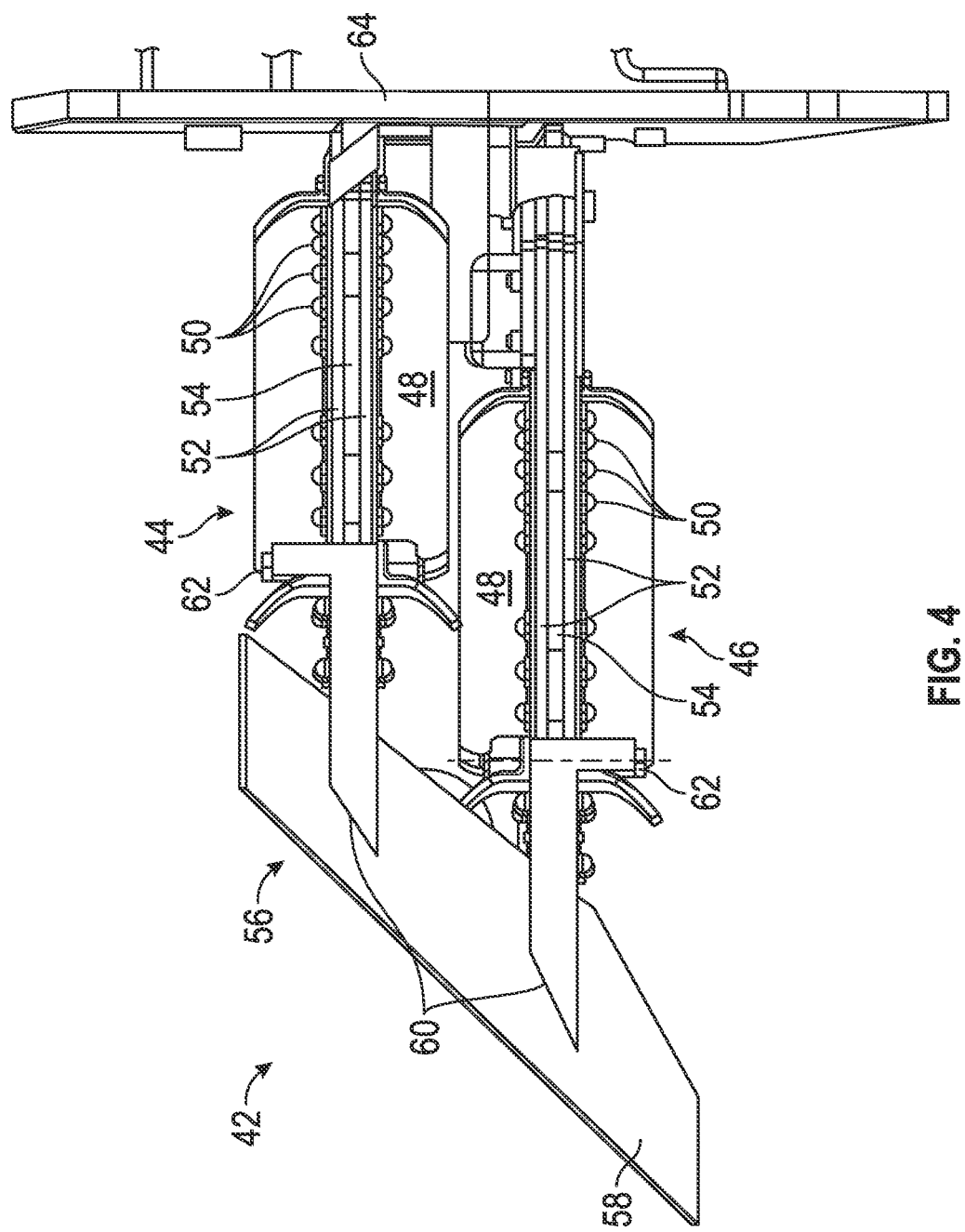
FIG. 4 shows a schematic side view of a left wing anti-collision strobe light unit of FIG. 1 according to a further embodiment of the invention.

FIG. 4 shows a schematic side view of a left wing anti-collision strobe light unit 42 according to a further embodiment of the invention.

In FIG. 4, the cover lens is omitted, in order to allow for a better view on the other parts of the strobe light unit 42.

The strobe light unit 42 is shown in FIG. 4, when looked at the airplane from an outside direction from the left, such that the strobe light supporting unit 64 is positioned rearwards of the light heads 44 and 46 and the stray light blocking element 56 is arranged in front of the light heads 44 and 46.

The strobe light unit 42 comprises an upper light head 44 and a lower light head 46. Both light heads 44 and 46 have the same configuration. They each comprise an arcuate reflector element 48 and upper and lower circuit boards 52 having a number of LEDs 50 arranged thereon wherein a carrier plate 54 is arranged between the upper and the lower circuit boards 52. The upper and lower circuit boards 52 are fixed in an appropriate manner to the carrier plate 54, for example they are screwed together.

The LEDs 52, which in this embodiment direct into upper and lower directions, respectively, and the arcuate reflector elements 48 are arranged such that light is projected into a desired range of directions, as explained above.

The reflector elements 48 are fixed to the carrier plate 54 and they can also be fixed to one or both of the circuit boards 52. The reflector element 58 and the carrier plate 54 and preferably also the upper and lower circuit boards 52 are attached to a strobe light unit supporting unit 64 which is arranged in FIG. 4 to the right of the left wing anti-collision strobe light unit 42.

The strobe light unit 42 further comprises a stray light blocking element 56. It has to be noted at this point that in the exemplary embodiment of FIG. 4, the strobe light unit 42 comprises one joined stray light blocking element 56 for the two light heads 44 and 46.

In an alternative embodiment, one stray light blocking element per light head can be provided.

In a further exemplary embodiment, more than two light heads per strobe light unit can be provided. Further, joined stray light blocking elements for two or more of the light heads can be provided.

The stray light blocking element 56 of FIG. 4 comprises a planar main portion 58 and upper and lower mounting arms 60 that are flexible as explained above, and that extend from the rear side of the planar main portion 58 to the upper and lower light heads 44 and 46, respectively. An upper mounting pin 42 extends through a rearward end of the upper mounting arm 60, through associated portions of the upper and lower circuit boards 52 and of the carrier plate 54 and through a forward end of the upper reflector element 48 of the upper light head 44. Such upper mounting pin 42 mounts the stray light blocking element 56 fixedly to the upper light head 44. Likewise, a lower mounting pin 42 extends through a rearward end of the lower mounting arm 60, through associated portions of the upper and lower circuit boards 52 and of the carrier plate 54 and through a forward end of the lower reflector element 48 of the lower light head 46. Such lower mounting pin 42 mounts the stray light blocking element 56 fixedly to the lower light head 46.

The planar main portion 58 is oriented at an angle with respect to a vertical plane such that the forward face shows in a direction obliquely upwards and it is oriented at an angle with respect to a horizontal plane such that the forward face shows in a direction to the inner side of the airplane, and particularly roughly into the direction of the cockpit.

The upper light head 44 is arranged with respect to the flight direction behind the lower light head 46, and the angle of the planar main portion 58 of the strobe light blocking element 56 with respect to a horizontal plane substantially corresponds to the horizontal distance by which the front ends of the upper and lower light heads 44 and 46 are spaced apart from each other.

According to exemplary embodiments of the invention, as described herein, strobe light is reliably prevented from being projected into undesired directions, whereas light projected into directions lying within the desired range of directions is unaffected and can pass. Thus, a glare that could occur when light would reach certain locations in the undesired directions, for example in a cockpit of an aircraft, is reliably avoided.

In a broad sense, all strobe light units benefit from the present invention, independently from their use and application.

Typical intensity values of the at least one light source, particularly the at least one light LED of strobe light units according to exemplary embodiments of the invention are 400 cd to 2000 cd.

The stray light blocking element, that can also be called anti-glare-shield or shield, is arranged directly at the at least one light source and the reflector element and attached to the reflector element or to a base portion of the strobe light unit. If such strobe light unit is placed within an at least partially transparent housing or behind a cover lens of a moving apparatus, for example behind the cover lens at the wing tip of an aircraft, the aerodynamic efficiency is unaffected by the strobe light unit and particularly by the internally mounted stray light blocking element, in contrast to a conceivable external solution, like an externally riveted metal shield part which would severely compromise the aerodynamic efficiency.

The stray light blocked by the stray light blocking element can be caused by any effects, particularly by a cover lens or a transparent cover positioned before or around the strobe light unit.

The stray light blocking element can be attached, particularly screwed, to the reflector element or to a base portion of the strobe light unit, which can be a carrier of the LEDs, particularly at least one of a circuit board and a carrier plate.

According to a particular embodiment, the LEDs are arranged on at least one circuit board, particularly on upper and lower circuit boards with a carrier plate arranged therebetween.

According to a particular embodiment, the at least one light source and the reflector element are configured for projecting parallel and/or radial light beams into the desired range of directions. Such parallel and/or radial light beams are unaffected by the stray light blocking element and can pass, whereas stray light beams in a direction lying in the range of undesired directions and hitting the light blocking element are blocked.

According to a further embodiment, the stray light blocking element comprises a substantially planar main portion, which substantially planar main portion extends into a radial direction from the at least one light source, such that parallel and/or radial light beams projected into the desired range of directions are substantially unaffected by the stray light blocking element and such that stray light beams of an undesired range of directions, particularly stray light beams reflected by an additional transparent cover or an additional transparent cover lens, are blocked. A strobe unit comprising such stray light blocking element has a comparably simple configuration and reliably avoids stray light from being projected into undesired directions.

According to a further embodiment, the substantially planar main portion of the stray light blocking element includes an angle of 30 to 60° with respect to an axis of symmetry of the reflector element. According to a further embodiment, the substantially planar main portion of the stray light blocking element is oriented at an angle with respect to a vertical plane such that the forward face shows in a direction obliquely upwards, and/or at an angle with respect to a horizontal plane such that the forward face shows in a direction to the inner side of the airplane, and particularly roughly into the direction of the cockpit.

Such orientations have to be found particularly effective for blocking out undesired stray light beams while letting light beams in directions lying within the desired range of directions pass.

According to a further embodiment, the reflector element comprises a substantially arcuate shape and a reflecting inner surface. The at least one light source can be arranged in front of the reflecting inner surface.

According to a further embodiment, the at least one light source is arranged within a space spanned by the inner surface of the reflector element and the straight line connecting the end portions of the inner surface.

By such embodiments, a particularly good light distribution in the desired range of directions around the desired angular range around the vertical axis as well as above and below the horizontal plane can be achieved.

According to a further embodiment, at least the rear end of the stray light blocking element is arranged in front of one end portion of the reflector element and/or in front of a lateral portion of said space. Such position of the stray light blocking element has to be found particularly effective in blocking stray light beams from being projected into undesired direction while letting light beams in directions lying within the desired range of directions pass.

According to a further embodiment, at least the main portion of the stray light blocking element is made of a flexible and/or non-transparent material, particular of a flexible and/or non-transparent plastics material. By making at least the main portion of the stray light blocking element of a non-transparent, particularly light-tight material it is ensured that no stray light can pass through the same.

According to a further embodiment, at least the main portion of the stray light blocking element is mounted to the reflector element or to the base portion of the strobe light unit in a flexible manner. By making at least the main portion of the stray light blocking element of a flexible material and/or by mounting at least the main portion of the stray light blocking element flexibly to the reflector element or to the base portion of the strobe light, the main portion of the stray light blocking element is movable and pivotable and is self-adapting/self-adjusting to a transparent cover or a cover lens positioned before the strobe light unit, to which the front of the main portion of the strobe light blocking element can abut.

According to a further embodiment, two or more light heads comprising at least one light source, particularly at least one LED and a reflector element are provided, which increases the intensity of illumination.

According to a further embodiment, one joint stray light blocking element is provided for the two or more light heads, which contributes for a particularly compact arrangement and prevents stray light from reaching undesired location very reliably.

Alternatively, separate stray light blocking elements can be provided for each of the light heads.

According to a further embodiment, the strobe light unit further comprises a cover lens, particularly a substantially arcuate-shaped cover lens, positioned, in optical direction, in front of the at least one light source and of the reflector element. Such cover lens protects the strobe light unit from external influences, for example if the strobe light unit is used in an aircraft from the heavy air-current and from external objects. Such cover lens can have the function of further distributing the light beams.

At such cover lens light beams projected by the at least one light source and the reflector element can be reflected into undesired directions to form stray light beams. If such strobe light unit is used in an aircraft, particularly those stray light beams that are reflected by such cover lens into the direction of the cockpit are undesired, and they are blocked reliably by the stray light blocking element.

It is stressed at this point, that in case the strobe light unit also comprises such cover lens, the stray light blocking element is arranged internally in the strobe light unit, particularly in an intermediate space between the at least one light source and the reflector element on the one hand and the cover lens on the other, and more particularly in an intermediate space between the line connecting the end portions of the inner surface of the reflector element and the inner surface of the cover lens.

According to a further embodiment, the main portion of the stray light blocking element has a rear end and a front end, seen in optical direction, the rear end being arranged in vicinity to one end portion of the reflector element, and the front end arranged close to or at the inner surface of the cover lens.

By such internal stray light blocking element stray light, mainly resulting from reflections at the transparent cover or cover lens can be reliably blocked from reaching positions lying in the undesired range of directions, for example the cockpit, in case the strobe light unit is used in an aircraft, and at the same time the aerodynamic efficiency is not compromised by such internal stray light blocking element, in case the strobe light unit is used in a moving apparatus such as an aircraft.

In case the front end of the stray light blocking element abuts the inner surface of the cover lens, the flexible plastics material of the stray light blocking element according to the respective embodiment as described above, and/or the flexible mounting of the stray light blocking element, according to the respective embodiment, as described above, ensure(s) that the cover lens is not damaged even when vibrations occur and that the front end of the stray light blocking element flexibly abuts to the inner surface of the cover lens in a self-adjusting, self-adapting manner According to exemplary embodiments of the aircraft, explained herein, strobe light is reliably prevented from reaching the cockpit and causing glare to the pilot which improves the efficiency of the pilot and safety.

Reflections of undesired strobe light can for example be caused by a complex aerodynamic shape of the cover lens or transparent glazing. The stray light reflected from the cover lens towards the flight inwards direction which can form an overlap area with a possible second wing anti-collision light can cause glare in the cockpit, and this is reliably prevented by an aircraft according to exemplary embodiments of the invention of the aircraft and specifically by providing and arranging the stray light blocking element of the wing anti-collision strobe light unit as defined in the claims. Furthermore since the stray light blocking element is arranged internally in the wing anti-collision strobe light unit, the aerodynamic efficiency is uncompromised.

At the same time, the light into the desired range of directions can be projected by the wing anti-collision strobe light unit without compromise.

According to a further embodiment, the substantially planar main portion of the stray light blocking element is oriented at an angle of +20° to −10° with respect to the flight direction and particularly substantially parallel to the flight direction. It has been found that by such orientation of the stray light blocking element the stray light can be blocked very effectively from reaching the cockpit.

According to a further embodiment of the invention, the at least one light source is arranged at an angle with respect to a horizontal plane.

According to a further embodiment, the at least one light source and the reflector element are oriented vertically or horizontally.

The advantages and embodiments as described herein with respect to the strobe light unit according to exemplary embodiments of the invention also apply to the aircraft comprising such strobe light unit, and they are not repeated for brevity.

While the invention has been described with reference to an exemplary embodiment, it will be understood by those skilled in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention is not limited to the particular embodiment disclosed, but that the invention will include all embodiments falling within the scope of the appended claims.

What is claimed is:

1. A wing anti-collision strobe light unit for an aircraft, comprising:
    at least one light source, particularly at least one LED;
    a reflector element,
    the at least one light source and the reflector element being configured for projecting light into a desired range of directions; and
    a stray light blocking element for blocking stray light from being projected into undesired directions, the stray light blocking element attached to the reflector element or to a base portion of the strobe light unit;
    wherein the stray light blocking element comprises a substantially planar main portion, which substantially planar main portion extends into a radial direction from the at least one light source, such that at least one of parallel and radial light beams projected into the desired range of directions are substantially unaffected by the stray light blocking element and such that stray light beams of an undesired range of directions, particularly stray light beams reflected by an additional transparent cover or an additional cover lens, are blocked; and
    wherein the substantially planar main portion of the stray light blocking element includes an angle of 30 to 60° with respect to an axis of symmetry of the reflector element.

2. Strobe light unit of claim 1, wherein the at least one light source and the reflector element are configured for projecting light beams into a desired range of directions.

3. Strobe light unit of claim 1, having at least one of the following features:
    the substantially planar main portion of the stray light blocking element is oriented at an angle with respect to a vertical plane such that the forward face shows in a direction obliquely upwards, and
    the substantially planar main portion of the stray light blocking element is oriented at an angle with respect to a horizontal plane such that the forward face shows in a direction to the inner side of the airplane, and particularly roughly into the direction of the cockpit.

4. Strobe light unit of claim 1, having at least one of the following features:
    the reflector element comprises a substantially arcuate shape and a reflecting inner surface, and
    the at least one light source is arranged in front of the reflecting inner surface.

5. Strobe light unit of claim 4, wherein the at least one light source is arranged within a space spanned by the inner surface of the reflector element and a straight line connecting the end portions of the inner surface.

6. Strobe light unit of claim 5, wherein at least a rear end of the stray light blocking element is arranged in front of one end portion of the reflector element and/or in front of a lateral portion of said space.

7. Strobe light unit of claim 1, having at least one of the following features:
    at least the main portion of the stray light blocking element is made of a material that is at least one of flexible and non-transparent, particularly of a plastics material that is at least one of flexible and non-transparent, and
    at least the main portion of the stray light blocking element is mounted to the reflector element or to the base portion of the strobe light unit in a flexible manner.

8. Strobe light unit of claim 1, wherein two or more light heads, each comprising at least one light source, particularly at least one LED, and a reflector element, are provided; and wherein one joint stray light blocking element is provided for the two or more light heads or wherein separate stray light blocking elements are provided for each of the light heads.

9. Strobe light unit of claim 1, further comprising a cover lens, particularly a substantially arcuate shaped cover lens, positioned, in optical direction, in front of the at least one light source and of the reflector element.

10. Strobe light unit of claim 9, wherein the main portion of the stray light blocking element has a rear end and a front end, seen in optical direction, the rear end being arranged in vicinity to one end portion of the reflector element, and the front end arranged close to or at the inner surface of the cover lens.

11. Aircraft comprising a cockpit and at least one strobe light unit arranged as a wing anti-collision strobe light unit, the strobe light including:
    at least one light source, particularly at least one LED;
    a reflector element,
    the at least one light source and the reflector element being configured for projecting light into a desired range of directions; and
    a stray light blocking element for blocking stray light from being projected into undesired directions, the stray light blocking element attached to the reflector element or to a base portion of the strobe light unit;
    wherein the stray light blocking element is arranged at the side of the strobe light unit oriented towards the cockpit, such that those stray light beams that are projected by the at least one light source and reflected by the cover lens into a direction towards the cockpit are blocked from reaching the cockpit.

12. Aircraft of claim 11, wherein the substantially planar main portion of the stray light blocking element is oriented at an angle of +20° to −10° with respect to the flight direction.

13. Aircraft of claim 12, wherein the at least one light source is arranged at an angle with respect to a horizontal plane.

14. Aircraft of any of claim 11, wherein the at least one light source and the reflector element are oriented vertically or horizontally.

15. A wing anti-collision strobe light unit for an aircraft, comprising:

at least one light source, particularly at least one LED;
a reflector element,
the at least one light source and the reflector element being configured for projecting light into a desired range of directions; and
a stray light blocking element for blocking stray light from being projected into undesired directions, the stray light blocking element attached to the reflector element or to a base portion of the strobe light unit;
wherein the stray light blocking element comprises a substantially planar main portion, which substantially planar main portion extends into a radial direction from the at least one light source, such that at least one of parallel and radial light beams projected into the desired range of directions are substantially unaffected by the stray light blocking element and such that stray light beams of an undesired range of directions, particularly stray light beams reflected by an additional transparent cover or an additional cover lens, are blocked; and
wherein the wing anti-collision strobe light unit has at least one of the following features:
the substantially planar main portion of the stray light blocking element is oriented at an angle with respect to a vertical plane such that the forward face shows in a direction obliquely upwards, and
the substantially planar main portion of the stray light blocking element is oriented at an angle with respect to a horizontal plane such that the forward face shows in a direction to the inner side of the airplane, and particularly roughly into the direction of the cockpit.

16. Strobe light unit of claim 15, wherein the at least one light source and the reflector element are configured for projecting light beams into a desired range of directions.

17. Strobe light unit of claim 15, having at least one of the following features:
the reflector element comprises a substantially arcuate shape and a reflecting inner surface, and
the at least one light source is arranged in front of the reflecting inner surface.

18. Strobe light unit of claim 17, wherein the at least one light source is arranged within a space spanned by the inner surface of the reflector element and a straight line connecting the end portions of the inner surface.

19. Strobe light unit of claim 18, wherein at least a rear end of the stray light blocking element is arranged in front of one end portion of the reflector element and/or in front of a lateral portion of said space.

20. Strobe light unit of claim 15, wherein two or more light heads, each comprising at least one light source, particularly at least one LED, and a reflector element are provided; and wherein one joint stray light blocking element is provided for the two or more light heads or wherein separate stray light blocking elements are provided for each of the light heads.

* * * * *